No. 714,419. Patented Nov. 25, 1902.
F. L. WETZEL.
MACHINE FOR FACILITATING THE ICING OR COATING OF BAKERY PRODUCTS.
(Application filed July 5, 1902.)
(No Model.) 5 Sheets—Sheet 1.
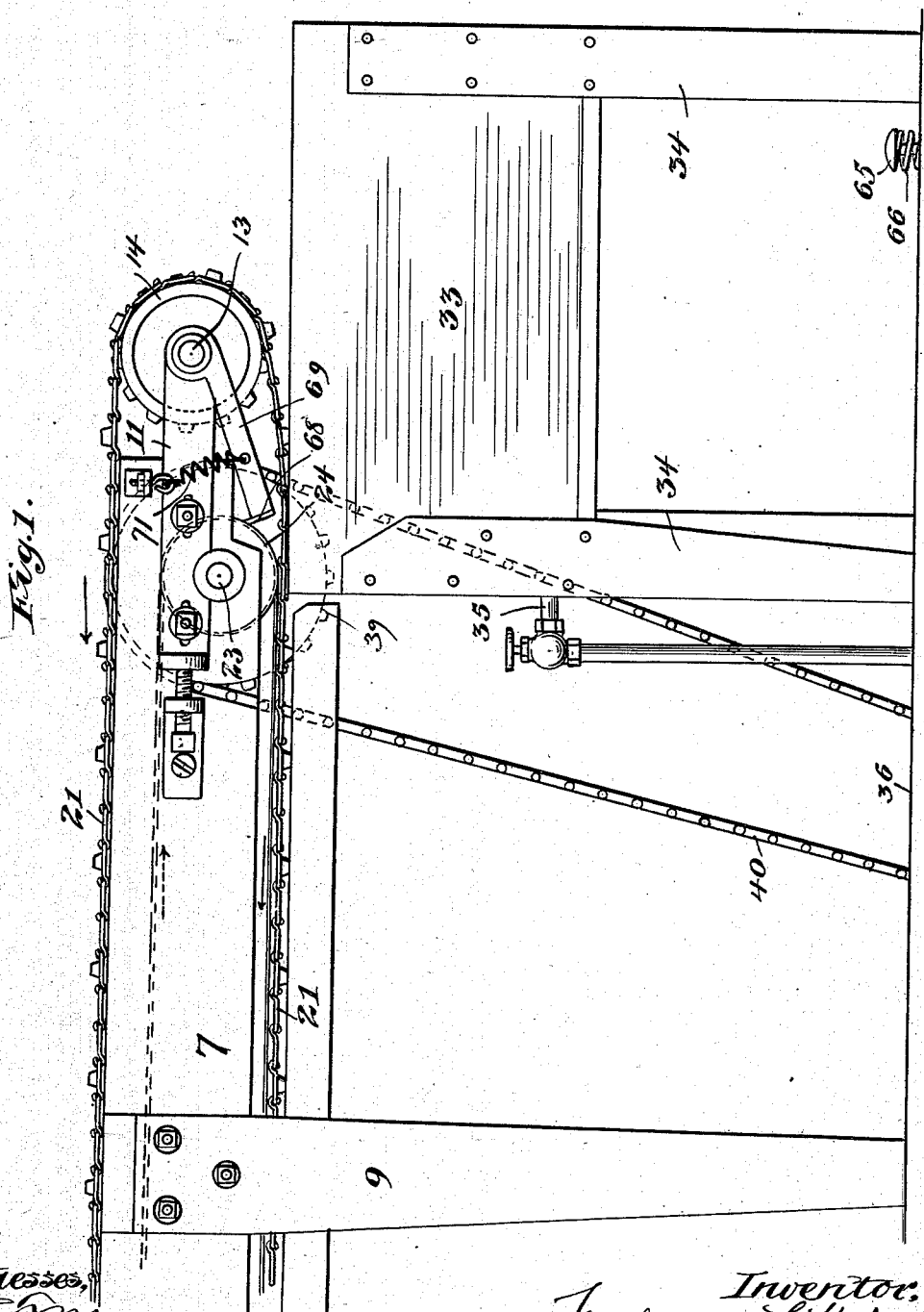

No. 714,419. Patented Nov. 25, 1902.
F. L. WETZEL.
MACHINE FOR FACILITATING THE ICING OR COATING OF BAKERY PRODUCTS.
(Application filed July 5, 1902.)
(No Model.) 5 Sheets—Sheet 2.
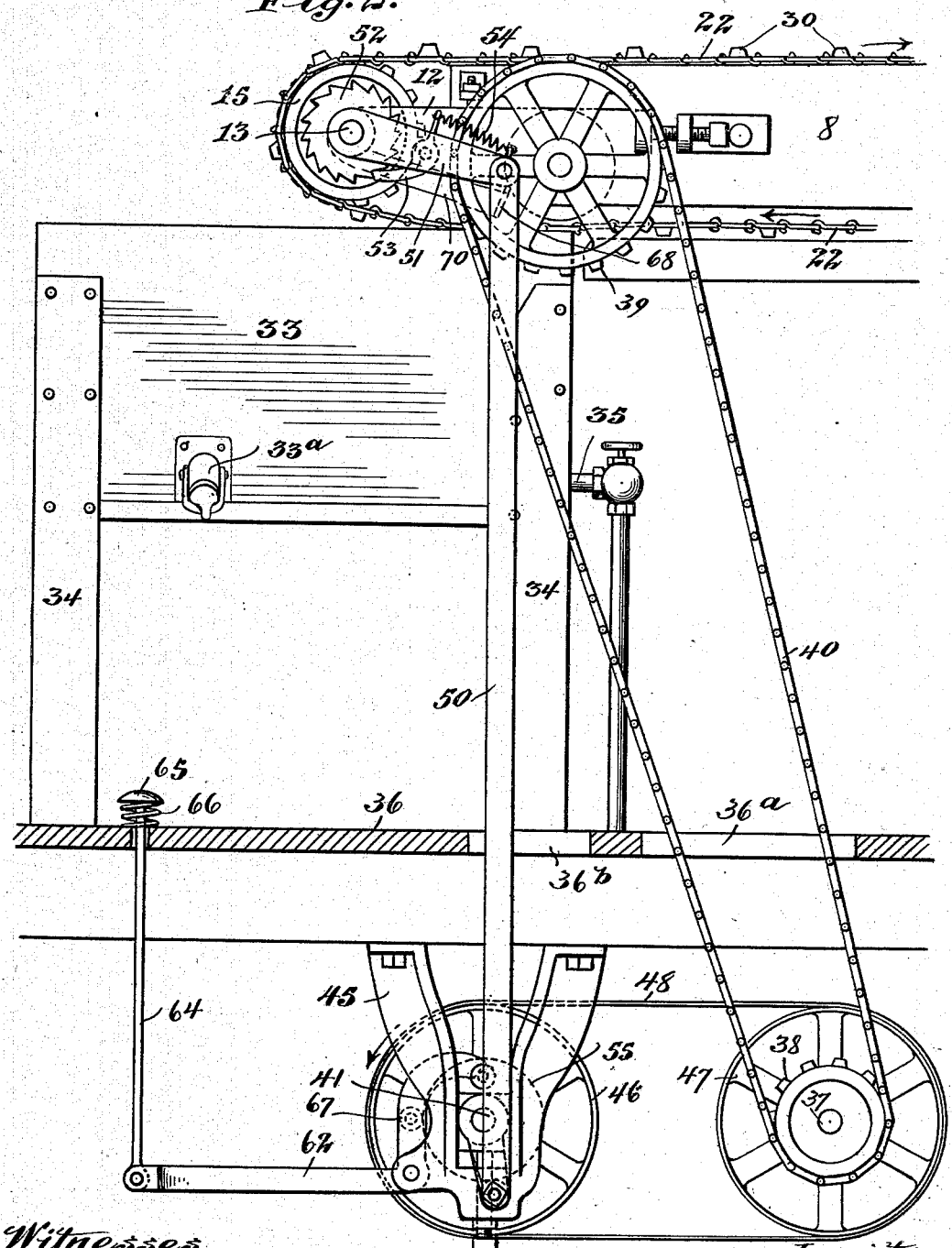

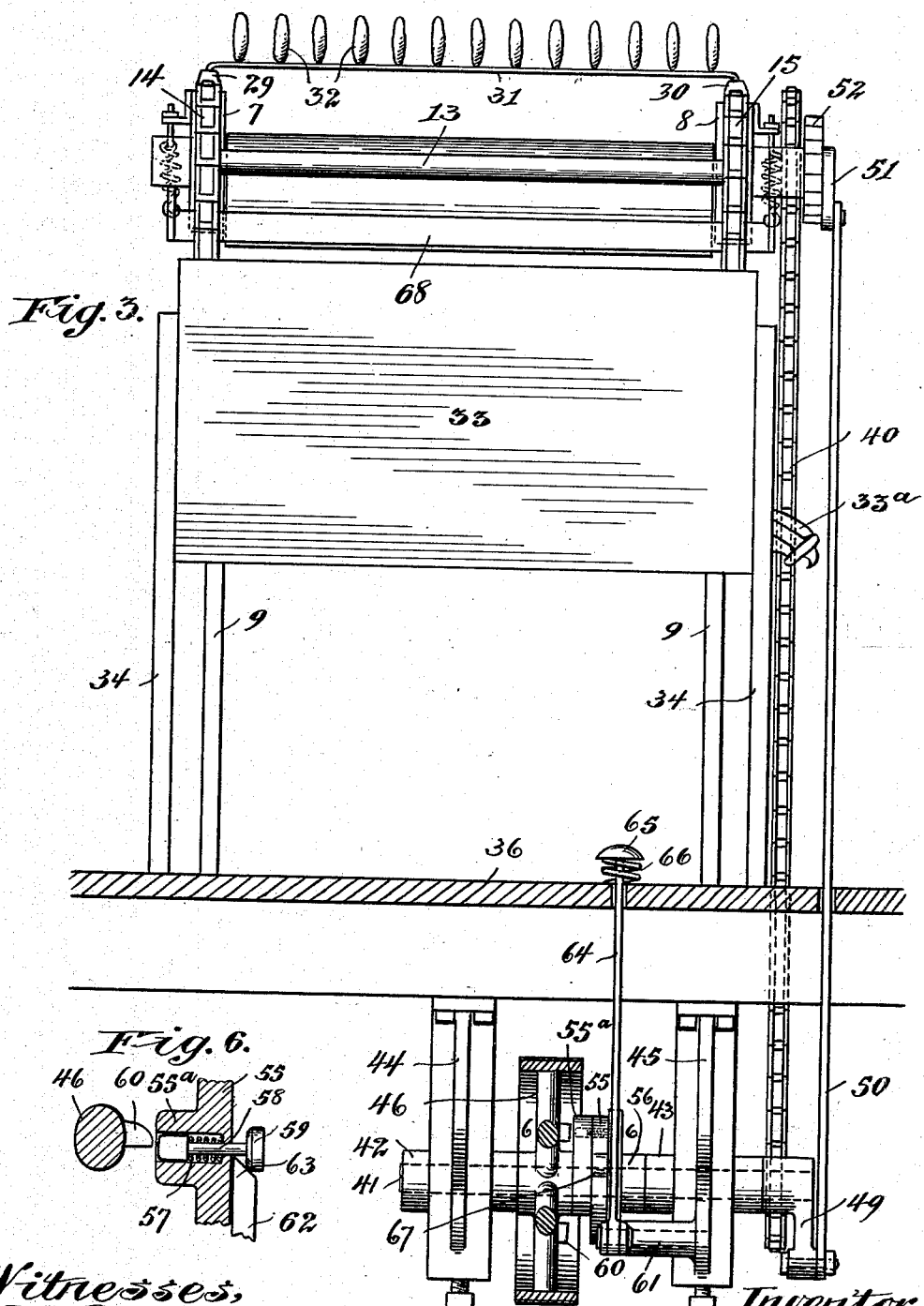

No. 714,419. Patented Nov. 25, 1902.
F. L. WETZEL.
MACHINE FOR FACILITATING THE ICING OR COATING OF BAKERY PRODUCTS.
(Application filed July 5, 1902.)
(No Model.) 5 Sheets—Sheet 4.
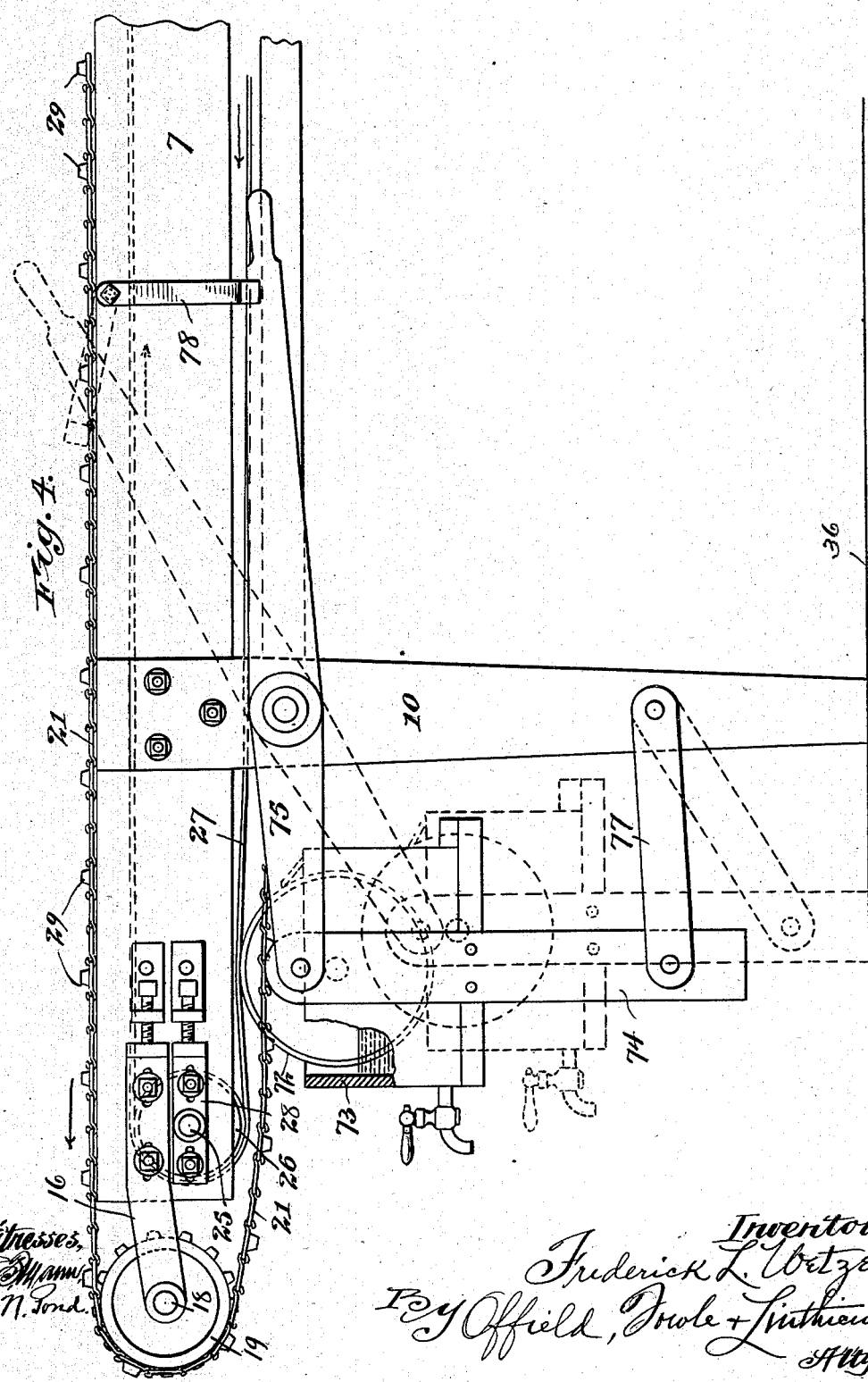
Witnesses
Inventor,
Frederick L. Wetzel
By Offield, Towle & Linthicum
Attys.

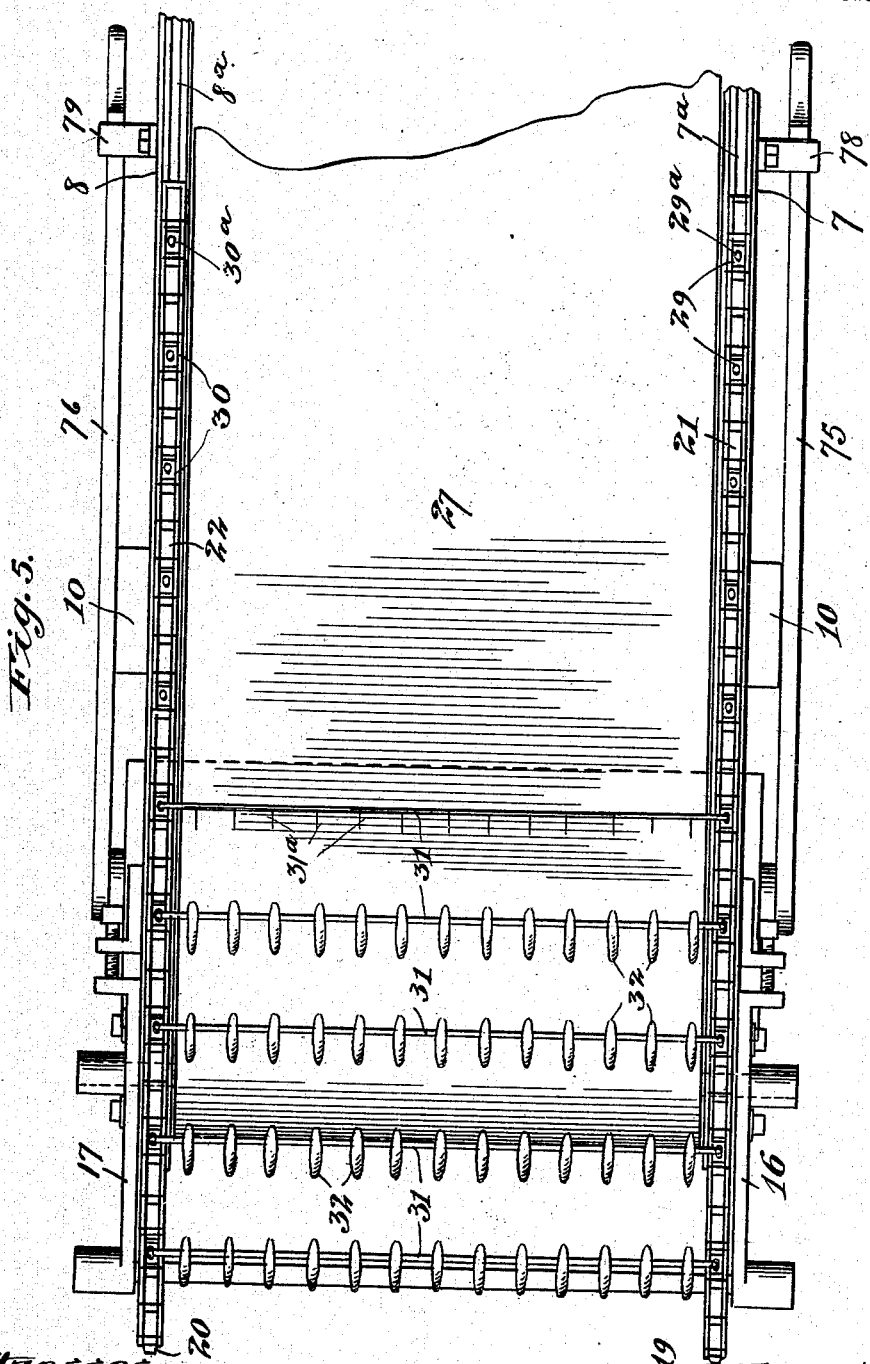

UNITED STATES PATENT OFFICE.

FREDERICK L. WETZEL, OF ST. LOUIS, MISSOURI, ASSIGNOR TO NATIONAL BISCUIT COMPANY, OF JERSEY CITY, NEW JERSEY, AND CHICAGO, ILLINOIS, A CORPORATION OF NEW JERSEY.

MACHINE FOR FACILITATING THE ICING OR COATING OF BAKERY PRODUCTS.

SPECIFICATION forming part of Letters Patent No. 714,419, dated November 25, 1902.

Application filed July 5, 1902. Serial No. 114,465. (No model.)

*To all whom it may concern:*

Be it known that I, FREDERICK L. WETZEL, a citizen of the United States, residing at St. Louis, in the State of Missouri, have invented certain new and useful Improvements in Machines for Facilitating the Icing or Coating of Bakery Products, of which the following is a specification.

My invention relates to apparatus for facilitating the icing or coating of cakes, biscuit, and other similar bakery products, and has reference more particularly to an improved machine designed to effect the partial drying of the goods after they have been dipped and at the same time to preserve the drippings therefrom and automatically return such drippings to the vat, thus preventing a considerable element of waste that has hitherto attended the coating and drying of such goods.

The principal object of my invention is to save both labor and expense and at the same time increase the capacity of baking establishments in respect to the output of iced and coated goods through the provision of a machine which shall obviate the delay hitherto incident to the operation of completely discharging the drip from the dipped goods prior to their assembling in the drying racks or frames, as well as prevent the waste and loss of the drippings by automatically returning the same to the vat or tank containing the coating material.

To this and other minor objects my invention consists in a novel machine of the character mentioned possessing as its chief constructional characteristics an endless carrier for the slow conveyance of the goods away from the icing-vat after they have been freshly dipped from the receiving to the delivery end of the machine in association with a drip-surface underlying the goods and having the function of automatically returning the drippings to the vat, this latter element being preferably in the form of an endless apron possessing a slow travel in a direction opposite to the direction of the travel of the goods.

One mechanical embodiment of my invention which I have found effective and successful in practice is illustrated in the accompanying drawings, in which—

Figure 1 is a side elevational view of the receiving end of the machine and the parts associated therewith. Fig. 2 is a similar view of the opposite side of the receiving end of the machine, illustrating also the stopping and starting devices for the power mechanism that drives the machine. Fig. 3 is a rear end view of the parts shown in Fig. 2. Fig. 4 is a side elevation of the delivery end of the machine and the parts associated therewith. Fig. 5 is a top plan view of that portion of the machine shown in Fig. 4, and Fig. 6 is a cross-sectional detail on the line 6 6 of Fig. 3 of a portion of the starting and stopping mechanism.

Referring to the drawings, the framework of the machine therein illustrated comprises, essentially, a pair of horizontally-disposed side frame-bars 7 and 8, supported on legs 9 and 10, adjacent the receiving and delivery ends thereof, respectively. To the receiving end of the side frame members 7 and 8 are bolted a pair of bracket-arms 11 and 12, respectively, in and between the outer ends of which is rotatably journaled a shaft 13, having fast thereon near its opposite ends a pair of sprocket-wheels 14 and 15. Adjustably secured to the opposite or delivery end of the side frame members are a similar pair of bracket-arms 16 and 17, in and between which is journaled a shaft 18, having fast thereon a corresponding pair of sprocket-wheels 19 and 20.

21 is an endless sprocket-chain extending between and over the sprocket-wheels 14 and 19, and 22 is a companion sprocket-chain similarly extending between and over the companion sprocket-wheels 15 and 20.

By reference to the plan view, Fig. 5, it will be observed that the upper edges of the side frame members 7 and 8 are longitudinally grooved, as at $7^a$ and $8^a$, to afford a seat and guide for the inner or under surfaces of the top sections of the endless sprocket-chains, whereby said chains are prevented from sagging and maintained at the same height and in strictly parallel relation throughout their entire travel from the receiving to the delivery end of the machine.

On a transverse shaft 23, rotatably journaled in and between the side bars 7 and 8 at the receiving end, is rigidly mounted a drum 24, and on a similar shaft 25, adjustably mounted at the opposite end of the machine-frame, is a companion drum 26, over and between which drums extends an endless apron or belt 27, constituting in the form of my invention herein shown the means for returning the drip to the dipping vat or tank. It will be observed that the drum-shaft 25 is mounted in longitudinally-adjustable bars 28 at the delivery end, whereby slack of the apron may be taken up as the latter tends to stretch or wear.

Referring again to the parallel sprocket-chains 21 and 22, it will be observed that these chains carry on the outer surface of certain of the links thereof at uniformly-spaced intervals vertically-disposed lugs 29 and 30, which lugs have holes or sockets $29^a$ and $30^a$, respectively, formed in their outer faces, the purpose of these sockets being to receive the downwardly-bent ends of a series of removable parallel transversely-extending rods 31, each of which rods has extending radially therefrom in the same or substantially the same direction a series of pins or prongs $31^a$, on which the coated or iced cakes (represented by 32) are impaled previous to the dipping and coating operation.

The above-described parts in the form shown and described or in mechanically equivalent forms constitute the principal and essential elements of my invention. For the sake of maximum convenience in applying the iced or coated goods to the machine without waste or loss of time the vat containing the icing or coating is preferably located in convenient proximity to the receiving end of the machine, being here indicated as a box or tank 33 supported upon legs 34 directly below the turn of the endless carrier at the receiving end of the machine. This vat is herein shown as provided with the usual steam-pipes 35, which control the temperature of the coating by passing through a body of water in the bottom of the tank 33, directly underlying the vat itself, and with the usual discharge or draw-off faucet $33^a$, communicating with the base of the vat.

In the embodiment of my invention herein illustrated I impart to the endless sprocket-chains an intermittent or step-by-step movement in a direction which carries the top section of the chains from the receiving toward the delivery end of the machine, and I simultaneously impart to the underlying endless apron 27 a slow continuous movement in the opposite direction. Any convenient means for effecting these relative movements of the parts mentioned may be employed within the scope of my invention in its broader aspects; but I will now proceed to describe a driving mechanism for these parts which I have found in practice to be efficient and satisfactory.

Assuming that 36 represents the floor upon which the machine rests, 37 may represent a shaft rotatably mounted beneath the floor 36 and continuously driven from any suitable source of power. From this shaft a continuous rotary movement is imparted to the shaft 23 of the apron-driving drum 24 by means of a pair of sprocket-wheels 38 and 39, fast on said shafts, respectively, and connected by an endless sprocket-chain 40, traveling through an aperture $36^a$ in the floor. By this means the apron 27 is given a continuous but slow movement, the upper section thereof traveling in a direction toward the icing-vat, as indicated by the arrows.

41 designates a short counter-shaft journaled in bearing-sleeves 42 and 43 in a pair of hangers 44 and 45, and 46 is a belt-pulley loose on the shaft 41 and driven from a belt-pulley 47, fast on the shaft 37, through a connecting driving-belt 48.

49 is a crank-arm fast on the outer end of the shaft 41, which crank-arm through a pitman 50, extending through an aperture $36^b$ in the floor, oscillates an arm 51, loosely mounted on the overhanging extremity of the shaft 13. Fast on said shaft 13, inside the arm 51, is a ratchet-disk 52, which is intermittently driven always in the same direction by a pawl 53, normally pressed into engagement therewith by a tension-spring 54.

Any convenient clutch mechanism with connections located, preferably, within reach of the foot of the operator may be employed to connect and disconnect the continuously-rotating pulley 46 with the shaft 41, that herein shown being as follows: 55 is a disk, the hub 56 of which is keyed fast on the shaft 41. This disk has on that face which is adjacent the pulley 46 an integral rib-like protruberance $55^a$, the purpose of which is to afford at a point near the periphery of the disk a part of sufficient thickness to afford a seat 57 for a spring-pressed pin 58, which pin is equipped with a beveled head 59, that under the action of the spring normally lies against that face of the disk which is remote from the pulley 46. On one or more of the spokes of the pulley 46 is located a laterally-projecting lug 60, which as the pulley rotates occupies a path into which the end of the pin 58 is projected by its spring when not withdrawn therefrom by the means next to be described. On an inwardly-projecting arm 61 on the lower end of the hanger 45 is pivoted a bell-crank lever 62, the shorter arm of which lever extends upwardly and terminates in an inwardly-curved end, which is provided with a beveled extremity 63, that is adapted to coöperate with the beveled head 59 of the pin 58 in the manner clearly shown in Fig. 6. The extremity of the longer arm of the bell-crank 62 is connected by a push-rod 64 with a button 65 just above the floor 36, there being interposed between the under side of said button and the floor a compression-spring 66, which is of sufficient strength to normally maintain the button elevated and the beveled nose 63 of the lever in operative engagement with the head of the pin 58 to maintain said pin withdrawn from the path of the lug or lugs 60. A roller 67, mounted on one side of the short arm of the bell-crank, rides in engagement with the periphery of the disk 55, and thereby prevents the sharpened end 63 of the lever from cutting or scoring the shank of the pin 58 in consequence of a continuous pressure thereagainst exerted by the spring 66.

From the foregoing it will be seen that so long as the operator maintains the button 65 depressed by her foot or otherwise the spring-pressed pin 58 will lie in the path of the continuously-traveling lug 60 and being engaged and picked up by the latter will effect a continuous rotation of the shaft 41, through which by the pawl-and-ratchet mechanism described the sprocket-chains will be given an intermittent or step-by-step movement continuously in the same direction, the upper sections of said chains always moving in a direction from the receiving to the delivery end of the machine, as indicated by the arrows. When, however, the operator for any reason desires to intermit the travel of the sprocket-chains, she releases the button 65, and the spring 66 throws the beveled nose of the bell-crank lever 62 into the circular path of travel of the beveled head 59 of the pin 58, so that as soon as the said parts have engaged each other in the manner shown in Fig. 6 the pin is at once retracted and the consequent rotation of the shaft 41 intermitted until such time as the button 65 is again depressed to renew the operation of the machine.

The machine as thus far described is complete and operative for its intended purpose, and its mode of operation may be briefly set forth as follows: Assuming that the vat contains a quantity of icing or coating in a semifluid condition, the operator receives from an assistant one of the rods 31, on which a group of cakes has been previously impaled, and holding said rod by its inwardly-bent extremities dips the said cakes in the coating, completely immersing them therein, and then upon withdrawing them seats the rod upon and across the main carrying-chains 21 and 22, seating the inwardly-bent ends of the rods in a pair of directly-opposite lugs 29 and 30 on said chains in the manner best shown in Figs. 3 and 5. Still holding her foot upon the button 65 to maintain the machine in operation, she quickly takes the next rod 31 and similarly immersing it in the coating seats it in the same manner in the next following lugs of the chains, the chains having during this while moved forward one step into convenient receiving position for said second cake-supporting rod. In this same manner the successive lugs on the carrying-chains receive their respective rods and move forward step by step to make room for succeeding rods. As the rods carrying the coated cakes thus advance slowly from the receiving to the delivery end of the machine the drippings therefrom fall upon the top surface of the underlying drip-apron, which, it will be remembered, is slowly traveling in the opposite direction, and by this apron are returned to the vat 33, falling from the apron to the vat as the apron rounds the drum 24. In order, however, to insure the delivery of the drippings from the apron to the vat at this point, I prefer to employ a scraper in the form of a transversely-extending bar or blade 68, carried at the ends of a pair of arms 69 and 70, mounted upon the transverse shaft 13 and elastically drawn upward by a tension-spring 71. By the time the several rods 31 have been carried from the receiving to the delivery end of the machine the drippings from the cakes impaled thereon will have entirely ceased and the coating or icing on said cakes will have congealed and hardened to such an extent as to permit the removal of the rods one by one by an assistant at the delivery end of the machine and the subsequent depositing of said rods upon a suitable drying rack or frame. I have found in practice that the sugar contained in the drip which is thus deposited upon the outer surface of the apron 27 is not entirely removed by the scraper 68 and if permitted to dry crystallizes and hardens thereon, thus rendering cleaning of the apron a somewhat difficult matter. In order to prevent this drying and crystallization of the sugar contained in the drippings, I prefer to employ means for continuously moistening the exposed surface of the apron, and in Fig. 4 I have shown a simple and convenient attachment for this purpose. This comprises a moistening-drum 72, journaled between the side walls of a water-tank 73, which tank is carried by and between a pair of uprights 74, attached to the end walls thereof and themselves vertically suspended from the forwardly-projecting extremities of a pair of hand-levers 75 and 76, pivoted on the legs 10 on opposite sides of the delivery end of the machine. The lower ends of the uprights 74 are connected with the lower portions of the legs 10 by pivoted links 77, thereby maintaining the uprights 74 vertical in all adjusted positions of the water-tank and preventing any tilting of the latter by the adjustments. Fig. 4 shows the moistening-drum in operative position in full lines and in idle or inoperative position in dotted lines, clearly illustrating the relative movements of the drum and tank and their supporting and operating devices. The side frame members 7 and 8 are equipped with conveniently-located pivoted catches 78 and 79 to engage the handle end of the levers 75 and 76, respectively, and hold the same depressed when the moistening-drum and its tank are in the elevated or operative position. It will be understood that the moistening-drum is driven by frictional contact of the apron therewith, imparting to the latter the moisture adhering to the surface thereof as freshly-wet portions of the latter continuously emerge from the liquid.

As will be evident from the described operation of the machine, the latter will be preferably made of such a length and capacity as to insure the discharge of all the drip from each transverse group of cakes during its travel from one end of the machine to the other when the machine is working without interruption and is being served at the full working speed and skill of the operator. This insures the removal of the cakes at the delivery end of the machine in a partially dry condition and entirely free from any further tendency to shed a portion of the coating applied thereto. Another important office served by my invention resides in its automatic return to the icing-vat of all the drippings shed by the cakes, thus preventing loss of material from this cause.

It will be evident that the machine hereinabove described might be modified in many respects by the substitution of other and equivalent parts therein to perform the same functions and effect the same results, and I do not, therefore, limit myself to the precise apparatus herein shown or to the exact relative arrangement of its coöperating parts, since it is obvious that the latter might be varied to a considerable extent within the spirit and purview of my invention.

I claim—

1. In a machine of the character described, the combination with an icing-vat, of an endless carrier for the dipped and coated goods, means for imparting to said carrier a slow travel of its carrying-surface away from said vat, and a drip-receiver underlying said carrying-surface of the carrier and serving to return the drippings to the vat, substantially as described.

2. In a machine of the character described, the combination with an icing-vat, of an endless-chain carrier for the dipped and coated goods, means for imparting to said carrier an intermittent travel of its carrying-surface away from said vat, and a drip-receiver underlying said carrying-surface of the carrier and serving to return the drippings to the vat, substantially as described.

3. In a machine of the character described, the combination with an icing-vat, of an endless carrier for the dipped and coated goods, means for imparting to said carrier a slow travel of its carrying-surface away from said vat, an endless drip-receiving apron underlying said carrying-surface of the carrier, and means for imparting to said apron a movement in a direction opposite to the travel of the carrier, substantially as described.

4. In a machine of the character described, the combination with a substantially horizontal rectangular supporting-frame, of a pair of parallel endless chains mounted to travel longitudinally of and on opposite sides of said machine-frame and serving as a carrier for dipped and coated goods, an icing-vat located at one end of said frame, an endless drip-receiving apron mounted to travel below the upper surface of said chains and at its discharging end overhanging said vat, and means for imparting movement to said chains and apron in opposite directions, substantially as described.

5. In a machine of the character described, the combination with a substantially horizontal supporting-frame and an endless drip-receiving apron mounted therein and longitudinally thereof, of a carrier for the dipped and coated goods mounted to travel on said frame above said apron, and a scraper yieldingly held against and across the outer surface of said apron, substantially as described.

6. In a machine of the character described, the combination with a substantially horizontal supporting-frame and an endless drip-receiving apron mounted therein and longitudinally thereof, of a carrier for the dipped and coated goods mounted to travel on said frame above said apron, an icing-vat located at one end of said frame beneath the discharging end of said apron, and a scraper-bar yieldingly held against and across the outer surface of said apron above said vat, substantially as described.

7. In a machine of the character described, the combination with a substantially horizontal supporting-frame and an endless drip-receiving apron mounted therein and longitudinally thereof, of a carrier for the dipped and coated goods mounted to travel on said frame above said apron, and a dampening device disposed across and in contact with the outer surface of said apron to prevent crystallization of the drip deposited thereon, substantially as described.

8. In a machine of the character described, the combination with a substantially horizontal supporting-frame and an endless drip-receiving apron mounted therein and longitudinally thereof, of a carrier for the dipped and coated goods mounted to travel on said frame above said apron, a scraper yieldingly held against and across the outer surface of said apron, and a dampening device also disposed across and in contact with the outer surface of said apron to prevent crystallization of the drip deposited thereon, substantially as described.

9. The combination, with the supporting-frame and the parallel endless sprocket-chains mounted thereon along the opposite sides thereof, of rod-supporting devices disposed at intervals on said chains, a series of rods equipped with laterally-extending cake-receiving prongs removably engaged at their ends by said rod-supporting devices transversely of and between said chains, and a drip-receiving apron mounted in said frame beneath said rod, substantially as described.

10. The combination, with the supporting-frame, the carrier for the dipped and coated goods mounted to travel thereon, and the endless drip-receiving apron mounted in said frame beneath said carrier, of a water-tank pivotally mounted on the frame beneath said apron, a dampening-drum rotatably mounted in said tank, and means for raising and lowering said tank to carry said drum into and out of contact with the under surface of said apron, substantially as described.

FREDERICK L. WETZEL.

Witnesses:
W. B. HOUSTON,
EDWARD FITZGERALD.